United States Patent [19]

Brandt et al.

[11] 3,989,019

[45] Nov. 2, 1976

[54] FUEL HEATING APPARATUS

[76] Inventors: Larry A. Brandt, Horace, N. Dak. 58047; Bruce R. Johnson, Box 12, Hickson, N. Dak. 58044

[22] Filed: July 29, 1974

[21] Appl. No.: 492,425

[52] U.S. Cl. .............................. 123/122 E; 123/133

[51] Int. Cl.[2] .......................................... F02M 31/00

[58] Field of Search ........ 123/122 H, 122 A, 122 F, 123/122 E, 133; 261/144, 142, 145

[56] References Cited

UNITED STATES PATENTS

| | | | |
|---|---|---|---|
| 1,168,111 | 1/1916 | Pope | 123/122 E |
| 1,300,600 | 4/1919 | Giesler | 123/122 E |
| 1,318,068 | 10/1919 | Giesler | 123/122 H |
| 1,319,718 | 10/1919 | Martin | 123/122 H |
| 2,884,917 | 5/1959 | Quinby | 123/133 |
| 3,110,296 | 11/1963 | Lundi | 123/122 E |
| 3,253,647 | 5/1966 | Deshales | 123/122 E |
| 3,354,872 | 11/1967 | Grentzmuller | 123/122 E |
| 3,625,190 | 12/1971 | Boissevern | 123/122 F |

*Primary Examiner*—Ronald H. Lazarus
*Attorney, Agent, or Firm*—Burd, Braddock & Bartz

[57] ABSTRACT

A self contained fuel heating apparatus for the heating of fuel for an internal combustion engine to raise the temperature thereof prior to the passage of the fuel into the engine for combustion. The fuel heating apparatus includes a tank defining a chamber having cooling medium inlet and outlet means to allow circulation of heated cooling medium in the chamber. A portion of the fuel line passes through the chamber where heat is exchanged from the cooling medium to the fuel prior to combustion. An auxiliary heater unit maintains the fuel and cooling medium heated in the chamber when the engine is not in operation to facilitate starting of a cold engine once again.

11 Claims, 3 Drawing Figures

FIG. 1
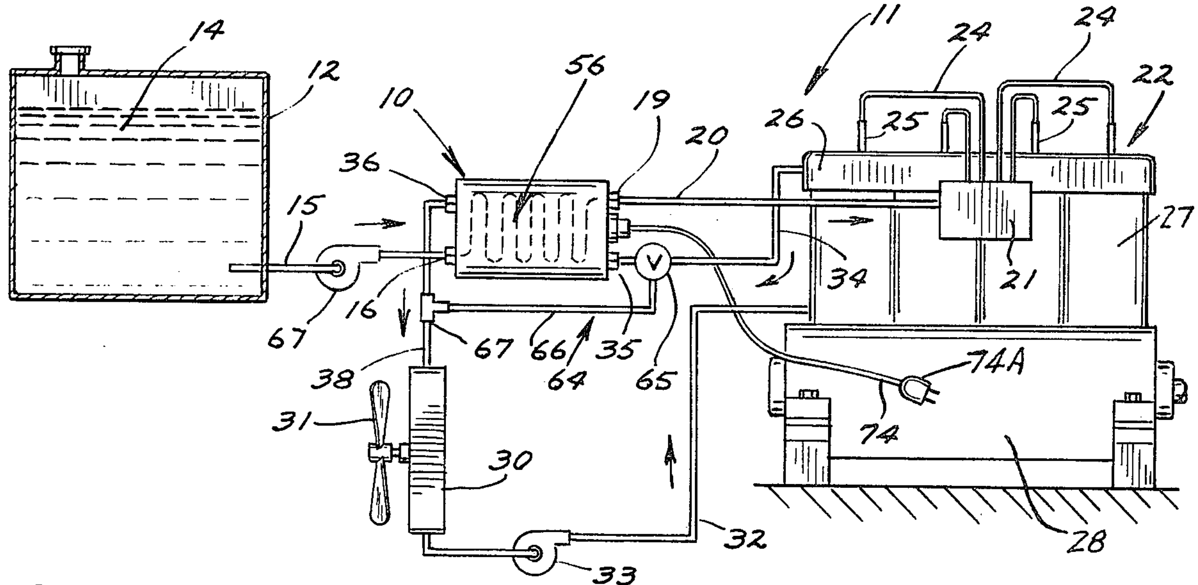
FIG. 2
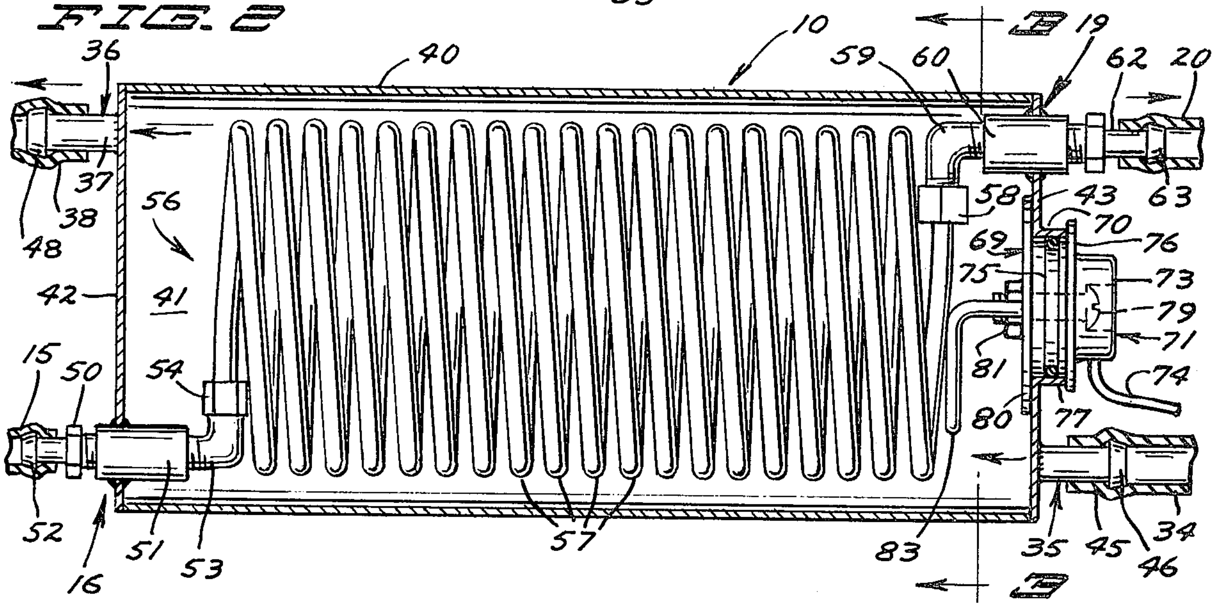
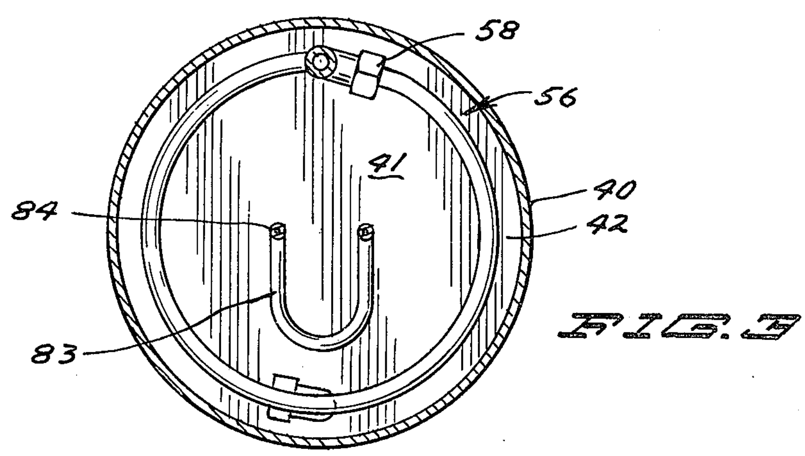
FIG. 3

FUEL HEATING APPARATUS

BACKGROUND OF THE INVENTION

Internal combustion engines, and particularly diesel engines, are difficult to start when the fuel, the engine cooling medium, and the engine are cold. When cold, diesel fuel can gel and solidify in the fuel filter and pump. Even when the engine is running, the high viscosity, lower grade No. 2 diesel fuel is prone to gel and cause the engine to stall by clogging fuel line filters and the fuel injection pump. Yet the No. 2 grade diesel fuel is lower in cost than the higher grade No. 1 fuel.

Preheating the fuel prior to combustion promotes greater efficiency of combustion. It also prevents gelling and solidifying of the fuel. Prior art devices have provided for means to preheat fuel through the use of the heated cooling medium of the engine prior to combustion. For example, see U.S. Pat. No. 1,300,600 to Giesler, and U.S. Pat. No. 3,354,872 to Gratzmuller. A common practice is to maintain a diesel engine running throughout periods of non-use to prevent the difficulty encountered when starting it again. Thus, it is also desirable to maintain the fuel heated when the engine is not running to facilitate starting of the engine and to allow the use of a more economical grade of fuel.

SUMMARY OF THE INVENTION

The invention relates to a self-contained fuel heating apparatus for use in association with internal combustion engines and particularly diesel engines. The apparatus is readily installable in engine assemblies and includes a tank or outer housing defining a chamber. The outer housing has inlet and outlet means to allow circulation of the engine cooling medium throughout the chamber. The cooling medium inlet and outlet are connected in the normal circulation system of the engine whereby the heated cooling medium coming from the engine passes through the chamber prior to passage into the radiator for cooling. Fuel inlet and outlet ports are provided in the housing and connected interiorly of the chamber by a fuel passage line disposed in a heat exchanging configuration and preferably constituted as a spiral coil having a series of longitudinally spaced convolutions within the chamber. The heated cooling medium circulates about the coil. As fuel passes through the coil, heat is exchanged from the cooling medium to the fuel in the coil.

A removable auxiliary heating element is located in heating relationship to the chamber and is adapted for heating the cooling medium in the chamber as well as the fuel located in the coil when the engine is not running. Preferably the auxiliary heater is constituted as an electric heater which may be plugged in to receive electrical energy from any convenient electrical outlet.

In a preferred embodiment, a thermal bypass is provided for the cooling medium whereby, in response to the temperature of the cooling medium, the cooling medium is made to bypass the heating apparatus to prevent overheating of the fuel.

An object of the invention is to provide an apparatus to preheat fuel prior to combustion in an internal combustion engine. A second object is to provide such an apparatus which employs heat from the engine cooling medium to preheat fuel. A further object of the invention is to provide such an apparatus having auxiliary heating means to maintain the temperature of the fuel and cooling medium when the engine is not running.

Further objects of the invention will become apparent upon the following description.

IN THE DRAWINGS

FIG. 1 is a schematic illustration of an internal combustion engine showing the fuel supply system and the cooling medium circulation system, and having the fuel heating apparatus according to the present invention installed therein;

FIG. 2 is an enlarged sectional view of the fuel heating apparatus of the present invention; and FIG. 3 is a sectional view of the fuel heating apparatus of FIG. 2 taken long the line 3—3 thereof.

DESCRIPTION OF PREFERRED EMBODIMENT

There is shown in FIG. 1 the fuel heating apparatus 10 of the present invention installed in an internal combustion engine assembly of the diesel type, indicated generally at 11. Engine assembly 11 may be located in a truck, tractor, or the like. Heating apparatus 10 is installed in interrupting relationship to both the fuel supply system and the cooling medium circulation system of engine assembly 11 to accomplish heat transfer from heated cooling medium to diesel fuel flowing to the diesel engine for combustion. Heating apparatus 10 provides a compact, self contained unit to heat fuel during operation of engine assembly 11 as well as when the engine assembly is shut down.

The fuel supply system of engine assembly 11 begins at a remote fuel storage tank 12 storing a suitable amount of diesel fuel 14. Diesel fuel 14 may be of the No. 2 grade which is economical but normally would be prone to gel and solidify in engine assembly 11. A first fuel line 15 leads from storage tank 12 and extends to a fuel inlet 16 of fuel heating apparatus 10. Intermediately disposed in the first fuel line 15 is a fuel pump 17 of the conventional variety to supply pressure to the fuel 14 and move it through the fuel supply system. With the engine assembly in operation, fuel exits the fuel outlet 19 of fuel heater 10 at a temperature higher than that at which it entered, as will be more fully described, and passes through a second fuel supply line 20 to a fuel injector pump 21 located proximate a diesel engine 22 of engine assembly 11. Injector pump 21 pumps the heated fuel through a plurality of injector lines 24 to a plurality of injector nozzles 25 installed in the head 26 of engine 22 located over piston cylinders 27 on engine block 28 for combustion therein in the usual fashion. As the fuel is preheated, it moves smoothly through the fuel line 20, fuel injector pump 21, injector lines 24 and nozzles 25. The fuel does not gel or solidify and is more efficiently burned in the pistons of engine 22.

The cooling medium circulation system of engine assembly 11 is of the standard, closed variety employing principally water as the cooling agent with additional antifreeze agent as needed. A heat exchanging radiator 30 has a fan assembly 31 for the cooling of cooling medium as it circulates therethrough. With engine assembly 11 in operation, cooling medium leaves the radiator 30 through a first cooling medium line 32 which travels to diesel engine 22. A water pump 33 located in the line 32 promotes circulation of the cooling medium throughout the system. In engine 22, heat exchange to the cooling medium takes place from the heat of combustion. Heated cooling medium exits the engine 22 through a second cooling medium line 34 which leads to the cooling medium inlet 35 of fuel heating apparatus 10. The cooling medium circulates about the fuel heating apparatus 10, as will be more fully described, and exits through the cooling medium outlet 36 entering a third cooling medium line or return line 38 which returns the cooling medium to the radiator 30.

Referring to FIGS. 2 and 3, there is shown in greater detail the fuel heating apparatus 10 having an elongate cylindrical tank or housing 40 defining an interior chamber 41 closed by end walls 42, 43. Cooling medium inlet 35 includes a nozzle 45 attached as by welding to the end wall 43 and opening into the chamber 41. Nozzle 45 is adapted to snugly receive and hold on a lip 46 a portion of the flexible, tubular cooling medium line 34. Likewise, fluid outlet 36 comprises a nozzle 47 attached as by welding to the end wall 42 and opening into the chamber 41 to allow flow of cooling medium outward of chamber 41. One end of flexible cooling medium return line 38 is held snugly on the nozzle 47 by fitting over the lip 48 at the end of nozzle 47. Cooling medium freely circulates within the chamber 41 between the inlet 35 and outlet 36. Fuel inlet 16 is located in end wall 42 of housing 40 and includes a nozzle 50 threaded into a connector 51 passing through wall 42. First fuel line 15 snugly fits over a lip 52 at the outer end of connector 51. The interior end of connector 51 located in the chamber 41 is connected by an elbow 53 and nut 54 to one end of a heat exchanger comprised as coil 56. Coil 56 comprises an elongated tubular member formed in a series of spaced apart coaxial coils or convolutions 57 having axis coincidental with that of the housing 40 and extending the length of chamber 41 to achieve a maximum amount of exposed surface area of convolutions 57. Coil 56 is preferably of a thermally conductive material such as copper tubing. The opposite end of coil 56 terminates at the end of chamber 41 opposite fuel inlet 16 and is connected by a nut 58 and elbow 59 to a fuel outlet connector 60 which passes through end wall 43. A nozzle 62 of fuel outlet 19 is threaded to the connector 69 and extends outward therefrom, terminating in a lip 63 which is snugly engaged by the second fuel line 20.

In use, fuel heating apparatus 10 is compact and readily installed in an engine assembly 11. When engine assembly 11 is operational, fuel at low temperature is pumped from the fuel tank 12 through the first fuel line 15 to the inlet 16 of housing 40 of fuel heating apparatus 10. Fuel enters inlet 16 and thence commences to circulate about the various convolutions 57 of coil assembly 56 toward fuel outlet 19. At the same time, heated cooling medium returning from the engine block and having obtained heat from combustion taking place in the engine enters from cooling medium line 34 into the cooling medium inlet 35. The cooling medium circulates throughout the chamber 41 around coil 56 wherein heat transfer is effected from the cooling medium through the convolutions 57 of coil 56 and to the relatively low temperature fuel thereby raising the temperature of the fuel. Having circulated throughout the chamber 41, the cooling medium exits through the cooling medium outlet 36 to the return line 38 where it returns to the radiator 30. The temperature of the fuel located in coil 56 is thus raised whereby the viscosity of the fuel is lowered and its flows more freely throughout the remainder of the system. The fuel at higher temperature ignites more easily in the combustion chamber of the engine 22 and burns more efficiently. The fuel is not prone to gel or solidify as it passes through the various filters on its way to the engine or as it passes through the injector fuel pump 21.

Referring to FIG. 1, there is optionally provided a cooling medium thermal bypass branch 64 which allows the cooling medium to bypass the fuel heating apparatus 10 when the temperature of the cooling medium reaches a preselected high limit thereby to avoid over-heating the fuel in the fuel heating apparatus 10. Bypass branch 64 includes a thermal responsive valve 65 installed in the second cooling medium flow line 34 upstream of the cooling medium inlet 35 to fuel heating apparatus 10. A branch line 66 extends from the thermal valve 65 to a T-connector 67 installed in the third cooling medium line 38 leading to the radiator 30. The branch line 64 bypasses the fuel heating apparatus 10. Normally thermal valve 65 allows passage of cooling medium through the cooling medium line 34 into inlet 35 while blocking passage into the branch line 64. However, in response to a preselected high temperature limit reached by the cooling medium in the second cooling medium line 34, thermal valve 65 closes the downstream portion of the second cooling medium line 34 and diverts the flow of the cooling medium through the branch line 66 to the third cooling medium line 38. Fuel flowing through the fuel heating apparatus 10 is thus prevented from reaching a precarious temperature. Thermal valve 65 may be any one of the number of various thermal valves suitable for the intended use and well known in the art.

Fuel heating apparatus 10 includes an auxiliary heating means, shown in FIGS. 2 and 3, to maintain the temperature of the fuel and coolant medium located in chamber 41 when the engine assembly 11 is not running, thereby to facilitate the restarting thereof. End wall 43 of housing 40 is provided with a central opening 69 surrounded by an outwardly directed peripheral flange 70 in which there is removably installed a heater unit 71. Heater unit 71 is preferably electrically operated, and has an insulated base 73 into which passes an electric cord 74. A plug portion 75 of heater unit 71 is connected to the base 73 and fills the expanse of central opening 69 defined by the flange 70. Adjacent the point of connection with the base 73, plug 75 has an extended shoulder 76 which bears against the outer edges of flange 70. An O-ring 77 surrounds the plug portion 75, being situated in an appropriate groove provided therein, and makes sealing engagement with the interior walls of the flange 70 to prevent outward flow of cooling medium through the central opening 69. Heater unit 71 is secured in central opening 69 by suitable means such as a bolt 79 passing centrally therethrough and passing through a plate 80 and being secured by a nut 81. The plate 80 spans the diameter of central opening 69 and bears against interior surfaces of the end wall 43. Thus, tightening of the bolt 79 and nut 81 causes the plate 80 to bear against the interior surfaces of end plate 43 to securely hold heater unit 71 in place. Heater unit 71 is readily removable for replacement or repair.

A heating element shroud 83 extends inward of chamber 41 from plug portion 74A, then bends to extend radially outward in chamber 41 forming a generally U-shaped section as shown in FIG. 3. Located within heater shroud 83 is a heating element 84 electrically connected to the cord 74 through the plug 75 and insulating base 73. Shroud 83 is a thermally conductive material to conduct the heat generated by heating element 84 into the chamber 41. As shown in FIG. 1, cord 74 has a standard prong connector 74A extendible to a remote location for connection with a standard electrical outlet.

In the use of the auxiliary heating unit 71, as when the engine assembly 11 is installed in a truck parked for the night with the engine 22 shut off, connector 74A of electric cord 74 is engaged in an electric outlet to energize the heating element 84 of heater unit 71. The heating element 84 maintains the temperature of the coolant located in the chamber 41 at a preselected level as well as maintaining the temperature of the fuel located in the convolutions 57 of coil 56 at the same preselected temperature level. The temperature gradient between the cooling medium located in the chamber 41 and that located out of the chamber 41, as well as the temperature gradient between the fuel located in the coil 56 and that located outside of the housing 40 will induce a certain amount of flow of both the cooling medium and the fuel thus to cause warmer fuel and cooling medium to be dispersed throughout a portion of the respective systems. When the operator goes to start his truck, he will not experience the usual difficulty associated with starting an engine when using a low grade or No. 2 fuel as it will be preheated. Once the engine assembly 11 is started, the fuel will continue to be preheated as previously described.

While there have been shown and described a particular embodiment according to the present invention, it will be apparent to those skilled in the art that certain deviations may be had from the embodiment illustrated without departing from the scope and spirit of the invention.

The embodiments of the invention in which an exclusive property or privilege is claimed are defined as follows:

1. A fuel heating apparatus for use with an internal combustion engine assembly of the type having a closed cooling medium circulation system circulating cooling medium through a plurality of cooling medium lines, and a fuel supply system adapted to deliver fuel through a fuel line to an internal combustion engine from a remote fuel supply, said heating apparatus comprising:

- a closed housing defining an interior chamber;
- cooling medium inlet means opening to said chamber adapted to receive cooling medium through a cooling medium line installed in said cooling medium circulation system;
- cooling medium outlet means leading from said chamber to another cooling medium line located in said cooling medium circulation system;
- fuel inlet means on said housing for connection with a portion of said fuel line extending from said remote fuel supply;
- fuel outlet means on said housing connectable to a portion of said fuel line leading to said internal combustion engine;
- heat exchange means located in said chamber adapted to carry fuel therein;
- said fuel inlet means and said fuel outlet means being connected to said heat exchange means whereby heat is exchanged from said cooling medium flowing in said chamber to fuel located in the heat exchange means;
- said housing having an opening to said chamber, a heater unit removably mounted in said opening, said heater unit having a plug portion to close said opening to prevent loss of cooling medium and having a heating element located in said chamber and selectively operable to heat the cooling medium in the chamber and fuel in the heat exchange means when the engine assembly is inoperative.

2. The fuel heating apparatus of claim 1 wherein: said cooling medium inlet means communicates with a portion of the cooling medium line coming from said internal combustion engine.

3. The fuel heating apparatus of claim 1 wherein: said heater unit includes an electric heater.

4. The fuel heating apparatus of claim 1 wherein: said heat exchange means includes an elongated tubular coil formed in a series of spaced apart convolutions located in said chamber.

5. The fuel heating apparatus of claim 1 including: a cooling medium inlet line connected to the cooling medium inlet means; a cooling medium outlet line connected to the cooling medium outlet means; a bypass branch line connected between the cooling medium inlet line and the cooling medium outlet line; a thermal valve located in said bypass line; said thermal valve adapted to normally allow cooling medium to pass through the cooling medium inlet line into the cooling medium inlet means but adapted to block the cooling medium inlet means in response to a preselected high temperature limit and cause the cooling medium to pass through said bypass branch line directly to the cooling medium outlet line.

6. The fuel heating apparatus of claim 1 wherein: said housing includes a generally cylindrical tank having end walls at each end.

7. The fuel heating apparatus of claim 6 wherein: said heater unit includes an electric heater, one of said end walls having said opening surrounded by an outwardly directed flange; said heater unit being located in closing relationship to said central opening and having a heating element shroud extending into said chamber, and an electric heating element located in said heating element shroud.

8. A fuel heating apparatus for use with an internal combustion engine assembly of the type having a closed cooling medium circulation system circulating cooling medium through a plurality of cooling medium lines, and a fuel supply system adapted to deliver fuel through a fuel line to an internal combustion engine from a remote fuel supply, said heating apparatus comprising:

- a housing having a side wall and end walls defining an interior chamber;
- cooling medium inlet means mounted on one end wall opening to said chamber adapted to receive cooling medium through a cooling medium line installed in said cooling medium circulation system;
- cooling medium outlet means mounted on the other end wall leading from said chamber to another cooling medium line located in said cooling medium circulation system;
- fuel inlet means on said housing for connection with a portion of said fuel line extending from said remote fuel supply;
- fuel outlet means on said housing connectable to a portion of said fuel line leading to said internal combustion engine;
- heat exchange means located in said chamber and extended between said end walls adapted to carry fuel therein;

said fuel inlet means and said fuel outlet means being connected to said heat exchange means whereby heat is exchanged from said cooling medium flowing in said chamber to fuel located in the heat exchange means;

one of said end walls having a central opening surrounded by an outwardly directed flange, an electric heater unit removably mounted in said central opening, said heater unit having a plug portion cooperating with said flange to close the central opening and prevent loss of cooling medium and having a heating element shroud located in said chamber and an electric heating element located in said heating element shroud selectively operable to heat the cooling medium in the chamber when the engine assembly is inoperative.

9. The fuel heating apparatus of claim 8 wherein: said cooling medium inlet means communicates with a portion of the cooling medium line coming from said internal combustion engine.

10. The fuel heating apparatus of claim 8 wherein: said heat exchange means includes an elongated tubular coil formed in a series of spaced apart convolutions located in said chamber.

11. The fuel heating apparatus of claim 8 including: a cooling medium inlet line connected to the cooling medium inlet means; a cooling medium outlet line connected to the cooling medium outlet means; a bypass branch line connected between the cooling medium inlet line and the cooling medium outlet line; a thermal valve located in said bypass line; said thermal valve adapted to normally allow cooling medium to pass through the cooling medium inlet line into the cooling medium inlet means but adapted to block the cooling medium inlet means in response to a preselected high temperature limit and cause the cooling medium to pass through said bypass branch line directly to the cooling medium outlet line.

* * * * *

UNITED STATES PATENT AND TRADEMARK OFFICE

CERTIFICATE OF CORRECTION

PATENT NO. : 3,989,019

DATED : November 2, 1976

INVENTOR(S) : Larry A. Brandt et al

It is certified that error appears in the above-identified patent and that said Letters Patent are hereby corrected as shown below:

Column 3, line 41, "69" should be --60--.

Column 3, line 64, "its" should be --it--.

Signed and Sealed this

Eleventh Day of January 1977

[SEAL]

*Attest:*

RUTH C. MASON
*Attesting Officer*

C. MARSHALL DANN
*Commissioner of Patents and Trademarks*